3,156,573
NOVEL FLUOSULFATE GLASSES
Isadore Mockrin, Plymouth Meeting, Pa., assignor to Pennsalt Chemicals Corporation, Philadelphia, Pa., a corporation of Pennsylvania
No Drawing. Filed June 11, 1962, Ser. No. 201,288
12 Claims. (Cl. 106—47)

This invention deals with a novel type of glass having unusual optical properties. More particularly, this invention deals with a fluosulfate glass containing trivalent cations of aluminum or iron.

The novel glasses of this invention are prepared by heating together at a temperature of at least about 600° C. a mixture of inorganic salts, which in combination produce sulfate ($SO_4^=$) and fluoride ($F^-$) anions, sodium cations ($Na^+$) and also a trivalent cation selected from the group consisting of aluminum and iron; e.g. $Al^{+++}$ and $Fe^{+++}$. Amounts of the inorganic salts will be taken so that certain molar ratios will be maintained; viz.: (a) the molar ratio of total anions to the trivalent cations is 3.5 to 5.0

$$\left(e.g. \ \frac{SO_4^= + F^-}{Al^{+++}} = 3.5 \ to \ 5.0\right)$$

(b) the molar ratio of fluoride ions to trivalent cation is 2.0 to 3.5

$$\left(e.g. \ \frac{F^-}{Al^{+++}} = 2.0 \ to \ 3.5\right)$$

and (c) the molar ratio of sulfate anions to trivalent cations is 1.0 to 2.0

$$e.g. \ \frac{SO_4^=}{Al^{+++}} = 1.0 \ to \ 2.0$$

The inorganic compounds useful may be selected from any of the large variety of those available and may be mixed in any manner with fluoride, aluminum and ferric ions supplied as simple or complex ions. It will be understood that the salts taken, the melt itself and the glass obtained may contain various complex ions, but for ease of discussion the species present will be considered as simple ions. Useful starting materials include fluorides such as aluminum fluoride, sodium fluoride, cryolite ($Na_3AlF_6$) and the like. Useful sulfates will include sodium sulfate, aluminum sulfate and the like. Where ferric iron will be employed as the trivalent cation, such salts as ferric sulfate and ferric fluoride may be used.

The novel glass compositions of this invention are amorphous, transparent solids which, as indicated above, can be considered to consist of sulfate and fluoride anions and cations of sodium and a trivalent cation selected from the group of aluminum and iron. It is believed that the sodium cations are in the interstices of a network making up the glass which consists of the trivalent cation (either aluminum or iron), the sulfate ions and the fluoride ions. At any rate, it has been found that the critical ratios of anions to trivalent cations as set forth above must be maintained to obtain a glass composition. Thus, for example, when 3 moles of sodium fluoride and 2 moles of aluminum sulfate are heated at 700° C., no glass is obtained. Based on the molar amounts of sodium fluoride and aluminum sulfate taken in such a case, the sum of the molar ratio of anions to trivalent cation is 2.25 and outside the required range of 3.5 to 5.0. On the other hand, when 4 moles of sodium fluoride is taken with 1 mole of aluminum sulfate so that the molar ratio of the sum of the anions to cations is 3.5, there is evidence of glass fusion. In a like manner, as will be seen in the examples which follow, the limits of the other required ratios must be maintained.

The novel glasses of this invention have several surprising properties which make them of particular value in several applications. Most surprising are the unusual optical properties of these glasses where the trivalent cation is aluminum. In particular, the relationship between the indices of refraction and the Abbé value of the glass is most unexpected and useful. The index of refraction of the glasses of this invention (wherein the cation is aluminum) is in the order of 1.45. Previously known optical glasses with an index of refraction of this value have an Abbé value of from about 65 to 95 (see for example FIGURE 1 of the Canadian Patent No. 442,240 to Sun and Huggins, U.S. Patent 2,578,325, and page 406 of the publication by G. W. Morey, "Properties of Glass," ACS Monograph No. 77). Surprisingly, the Abbé values for the glasses of this invention wherein the index of refraction is about 1.45 are very much lower, being on the order of about 47. Thus, the compositions of this invention provide a new field of glass with which new combinations of optical properties may be designed.

The process by which these novel glasses are made is quite straightforward and involves no changes from known techniques of glass making. The ingredients are simply mixed together and melted in a suitable closed container. The melting proceeds at temperatures of about 600° C. and higher, and it has been found that a molten mass can be obtained in a relatively short time. Preferably, the ingredients will be held at about 700° C. for about 30 minutes after which time the molten mass may be cooled to obtain the finished glass. This novel glass flows at about 500° C. and may be worked in the usual manner.

*Example 1*

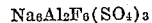

A finely ground mixture of 6 moles of sodium fluoride and 1 mole of aluminum sulfate was placed in a platinum crucible, the crucible covered and then heated at 700° C. for 30 minutes. A melt formed which when cooled to room temperatures was a glass. X-ray diffraction of the solid showed an amorphous pattern confirming the glassy nature of the material. This glass softened at 400° C. and flowed readily at 500° C. Its index of refraction is 1.43 and it has an Abbé value below 47. Molar ratios of anions to cations are as follows:

$$\frac{F^- + SO_4^=}{Al^{+++}} = 4.5, \ \frac{F^-}{Al^{+++}} = 3.0, \ \frac{SO_4^=}{Al^{+++}} = 1.5$$

Analysis of the glass indicated 20.4% F (theory 19.4% F).

*Examples 2 to 14*

Following the details of Example 1, other combinations of fluorides and sulfates were heated at 700° C. The following table illustrates the reagents and products obtained.

TABLE I

| Example No. | Reaction | Ratio of the sum of Anions to Trivalent Cation | Ratio of Fluoride Anions to Trivalent Cation | Ratio of Sulfate Anion to Trivalent Cation | Remarks |
| --- | --- | --- | --- | --- | --- |
| 2 | $2NaF + 3Al_2(SO_4)_3 \rightarrow Na_2Al_6F_2(SO_4)_9$ | 1.83 | 0.33 | 1.5 | No glass formed. |
| 3 | $3NaF + 2Al_2(SO_4)_3 \rightarrow Na_3Al_4F_3(SO_4)_6$ | 2.25 | 0.75 | 1.5 | Do. |
| 4 | $4NaF + Al_2(SO_4)_3 \rightarrow Na_4Al_2F_4(SO_4)_3$ | 3.50 | 2.0 | 1.5 | Some glass formed. |
| 5 | $4.72\ NaF + Al_2(SO_4)_3 \rightarrow Na_{4.72}Al_2F_{4.72}(SO_4)_3$ | 3.86 | 2.36 | 1.5 | Glass formed.[A] |
| 6 | $Na_3AlF_6 + 3Na_2SO_4 + Al_2(SO_4)_3 \rightarrow Na_9Al_3F_6(SO_4)_6$ | 4.0 | 2.0 | 2.0 | Do.[C] |
| 7 | $6NaF + Al_2(SO_4)_3 \rightarrow Na_6Al_2F_6(SO_4)_3$ | 4.5 | 3.0 | 1.5 | Do. |
| 8 | $3Na_3AlF_6 + 3Na_2SO_4 + Al_2(SO_4)_3 \rightarrow Na_{15}Al_5F_{18}(SO_4)_6$ | 4.8 | 3.6 | 1.2 | Do. |
| 9 | $2Na_3AlF_6 + 3Na_2SO_4 + Al_2(SO_4)_3 \rightarrow Na_{14}Al_4F_{14}(SO_4)_6$ | 5.0 | 3.5 | 1.5 | Do. |
| 10 | $5NaF + Fe_2(SO_4)_3 \rightarrow Na_5Fe_2F_5(SO_4)_3$ | 4.0 | 2.5 | 1.5 | Do.[B] |
| 11 | $6NaF + Fe_2(SO_4)_3 \rightarrow Na_6Fe_2F_6(SO_4)_3$ | 4.5 | 3.0 | 1.5 | Do.[B] |
| 12 | $7NaF + Al_2(SO_4)_3 \rightarrow Na_7Al_2F_7(SO_4)_3$ | 5.0 | 3.5 | 1.5 | Some glass formed. |
| 13 | $9NaF + Al_2(SO_4)_3 \rightarrow Na_9Al_2F_9(SO_4)_3$ | 6.0 | 4.5 | 1.5 | No glass formed. |
| 14 | $12.3NaF + Al_2(SO_4)_3 \rightarrow Na_{12.3}Al_2F_{12.3}(SO_4)_3$ | 7.65 | 6.2 | 1.5 | Do. |

[A] Index of refraction: $n_D = 1.448$; Abbé value = 46.9.   [B] Opaque, brown glass.   [C] A glass was also obtained by fusing at 600° C.

While the invention has been described in terms of a glass containing only sodium as the interstitial cation in the glass network, it is possible to partially replace the sodium ion with other alkali metal ions and also with alkaline earth metal ions. When such replacement is made substantial amounts (about 50 mole percent of the sodium ion) may be used, but with the alkaline earth metal ions the replacement of the sodium ion will be limited to about 10 mole percent. For example, when part of the sodium fluoride of Example 5 was replaced with $CaF_2$ so that 7.63 moles of NaF, 0.53 mole of $CaF_2$ and 1.84 moles of $Al_2(SO_4)_3$ are reacted, a product glass corresponding to $Na_{7.6}Ca_{0.5}Al_{3.7}F_{8.7}(SO_4)_{5.5}$ was obtained. In like manner, potassium, caesium, ribidium, barium, etc. may be used to partially replace the sodium ion with equivalent results. However, if all of the sodium is replaced even with alkali metals such as lithium or potassium there is a strong tendency toward crystallization. The amount of sodium or other cation, other than the trivalent aluminum or iron, which will be present in the glass compositions will, of course, be sufficient to preserve the electro-neutrality of the system.

It will be understood that numerous changes and variations may be made from the above description and examples without departing from the spirit and scope of the invention.

I claim:

1. A novel fluosulfate glass composition consisting of fluoride and sulfate anions, and cations consisting essentially of sodium and a trivalent cation selected from the group of aluminum and iron, the sum of the molar ratio of said anions to trivalent cation being between 3.5 and 5.0, the molar ratio of fluoride anions to trivalent cation being between 2.0 and 3.5, and the molar ratio of sulfate anions to trivalent cation being between about 1.0 and 2.0.

2. A glass composition as in claim 1 wherein the trivalent cation is aluminum.

3. A glass composition as in claim 1 wherein the trivalent cation is ferric iron.

4. A glass composition having the empirical formula $Na_6Al_2F_6(SO_4)_3$.

5. A glass composition having the empirical formula $Na_{4.72}Al_2F_{4.72}(SO_4)_3$.

6. A glass composition having the empirical formula $Na_9Al_3F_6(SO_4)_6$.

7. A glass composition having the empirical formula $Na_6Fe_2F_6(SO_4)_3$.

8. A glass composition as in claim 1 containing an alkali metal ion in addition to the sodium ion.

9. A glass composition as in claim 1 wherein up to 10 mole percent of the sodium ion is replaced by an alkaline earth metal ion.

10. A glass composition as in claim 9 wherein the alkaline earth metal is calcium.

11. A glass composition having the empirical formula $Na_{7.5}Ca_{0.5}Al_{3.7}F_{8.7}(SO_4)_{5.5}$.

12. A process for preparing a fluosulfate glass which comprises heating in a closed container at a temperature of at least about 600° C. and thereafter cooling to a solid a mixture of inorganic salts which produce sulfate and fluoride anions, sodium cations, and a trivalent cation selected from the group consisting of aluminum and iron, the amounts of inorganic salts being taken so that the sum of the molar ratio of total anions to trivalent cation is between about 3.5 and 5.0, the molar ratio of fluoride ion to trivalent cation is between about 2.0 and 3.5, and the molar ratio of sulfate ion to trivalent cation is between about 1.0 to 2.0.

References Cited in the file of this patent

UNITED STATES PATENTS 2,578,325    Kuan-Han Sun et al. _____ Dec. 11, 1951

OTHER REFERENCES

Levin et al.: Phase Diagrams for Ceramists, published 1956, by American Ceramic Society, Inc. (Figure 679, page 232).

UNITED STATES PATENT OFFICE
CERTIFICATE OF CORRECTION

Patent No. 3,156,573                          November 10, 1964

Isadore Mockrin

It is hereby certified that error appears in the above numbered patent requiring correction and that the said Letters Patent should read as corrected below.

Column 4, line 36, the formula should appear as shown below instead of as in the patent:

$$Na_{7.6}Ca_{0.5}Al_{3.7}F_{8.7}(SO_4)_{5.5}$$

Signed and sealed this 30th day of March 1965.

(SEAL)
Attest:

ERNEST W. SWIDER                                    EDWARD J. BRENNER
Attesting Officer                                          Commissioner of Patents